United States Patent [19]

Hirohata et al.

[11] 4,401,378

[45] Aug. 30, 1983

[54] CAMERA HAVING AUTOMATIC FOCUS FUNCTION AND AUTOMATIC EXPOSURE FUNCTION

[75] Inventors: Michio Hirohata, Inagi; Hideo Ikari, Tokyo, both of Japan

[73] Assignee: Canon Kabushiki Kaisha, Tokyo, Japan

[21] Appl. No.: 373,272

[22] Filed: Apr. 29, 1982

[30] Foreign Application Priority Data

May 9, 1981 [JP] Japan .................... 56-69767

[51] Int. Cl.³ .................... G03B 3/10; G03B 9/14
[52] U.S. Cl. .................... 354/195; 354/234
[58] Field of Search .................... 354/25 R, 25 N, 195, 354/197, 202, 234, 235, 271

[56] References Cited

U.S. PATENT DOCUMENTS 4,167,316  9/1979  Johnson et al. .................... 354/197
4,319,822  3/1982  Tezuka et al. .................... 354/234
4,348,092  9/1982  Hirohata et al. .................... 354/234 X Primary Examiner—William B. Perkey
Attorney, Agent, or Firm—Toren, McGeady and Stanger

[57] ABSTRACT

A coil-like conductor is provided in combination with a rotor arranged to rotate in different directions depending upon the direction of current flow to this conductor, and the rotor is drivingly connected to open and close blade members. When a first current supply is generated, as the rotor rotates from an initial position in a direction to further close the blade members, a focus adjusting operation is initiated. Upon termination of the focus adjusting operation, the direction of current flow to the conductor is reversed. As the completion of focus adjusting is followed by a subsequent current supply, the rotor is caused to rotate in a direction to open the blade members, thus initiating an exposure operation.

5 Claims, 4 Drawing Figures

CAMERA HAVING AUTOMATIC FOCUS FUNCTION AND AUTOMATIC EXPOSURE FUNCTION

BACKGROUND OF THE INVENTION

1. Field of the Invention

This invention relates to electromagnetic drive devices of the moving coil type of which the direction of action is made to differ depending upon the direction of current flow, and more particularly to cameras with such a moving coil rendering it possible to control the operation of a focus adjusting mechanism and an exposure mechanism.

2. Description of the Prior Art

At the present time, state-of-the-art cameras are provided with a coil drivingly connected to the shutter blades and positioned in a magnetic field so that upon current supply to this coil, it is driven to move by electromagnetic force according to Fleming's left hand law so that the shutter blades are opened and closed. This is the so-called moving coil type electromagnetic drive device. However, there is not yet known a device which is made to also serve to control the initiation and termination of an operation of an automatic focus adjusting mechanism (hereinafter described as an "AF" mechanism). This is because in the moving coil type electromatic drive device, it is a prerequisite that the ordinary penlight (size AA) battery be used as the common electrical energy source. Thus, the device built into the camera cannot provide a driving torque large enough to effect functions other than opening and closing of the shutter blades, for example, actuation of an AF mechanism, while still preserving the reliability and accuracy of shutter control. Thus, if at the time of opening and closing of the shutter blades, the coil is subjected to an external interference, motion of the coil will become unstable, thereby creating a problem in that the accuracy of exposure control is reduced.

On the other hand, it is known to provide other types of electromagnetic drive devices different from the moving coil type, for example, one in which the operation of the focus adjusting mechanism and the opening and closing operation of the shutter blades is controlled by using only one solenoid as disclosed in U.S. Pat. No. 4,167,316, issued Sept. 11, 1979. This device operates in such a manner that, as the plunger of the solenoid is drivingly connected to the shutter blades, when the solenoid is first energized, the plunger is attracted to move from the initial position, whereby operation of the focus adjusting mechanism is initiated. Then when the aforesaid energization is terminated, as the plunger moves under the action of a return spring, the operation of the focus adjusting mechanism is terminated, and the shutter blades start to open. After that when the solenoid is energized again, as the plunger is attracted, the shutter blades are closed.

Since, however, the electromagnetic drive device in the form of the solenoid when energized only moves the plunger in one direction, the use of the common solenoid in selectively controlling the operations of the focus adjusting mechanism and the shutter mechanism leads to the existence of the drawback that its arrangement becomes very complicated. Also, in the aforesaid example of the prior art arrangement in which when the solenoid is de-energized, the plunger moves by spring forces to effect simultaneous stopping of the focus adjusting operation and an initiation of the opening of the shutter blades, it is impossible to control the individual operations independently of each other. Therefore, there is no opportunity for permitting a timer mechanism to be operated as the necessity arises after the completion of the focus adjusting, and thereby the initiation of the shutter operation cannot be deferred, and an exposure with a self-timer cannot be made.

In short, where the electromagnetic drive device for controlling both the focus adjusting operation and the shutter operation is constructed in the form of a solenoid arranged upon energization to move the plunger in only one direction, the complexity of the structure of the camera is increased, and the capabilities of the camera are reduced.

SUMMARY OF THE INVENTION

With the foregoing in mind, it is an object of the present invention to utilize the electromagnetic force working on a coil arranged in the magnetic field to act in different directions depending upon the direction of current flow in the coil, and to provide a camera having an automatic focus function and an automatic exposure function with the coil made to move in two different directions selectively, whereby the focus adjusting operation and the opening and closing operation of the shutter can be controlled independently of each other.

Another object of the present invention is to provide a camera having an automatic focus function and an automatic exposure function with means rendering it possible to change the direction of current supply to the coil in automatic response to motion of the coil, whereby changing the direction of current supply after the completion of the focus adjusting operation can be controlled very accurately and reliably.

These and other objects of the present invention will become apparent from the following description of an embodiment thereof taken in connection with the accompanying drawings.

DETAILED DESCRIPTION OF THE PREFERRED EMBODIMENTS

Figure 1:
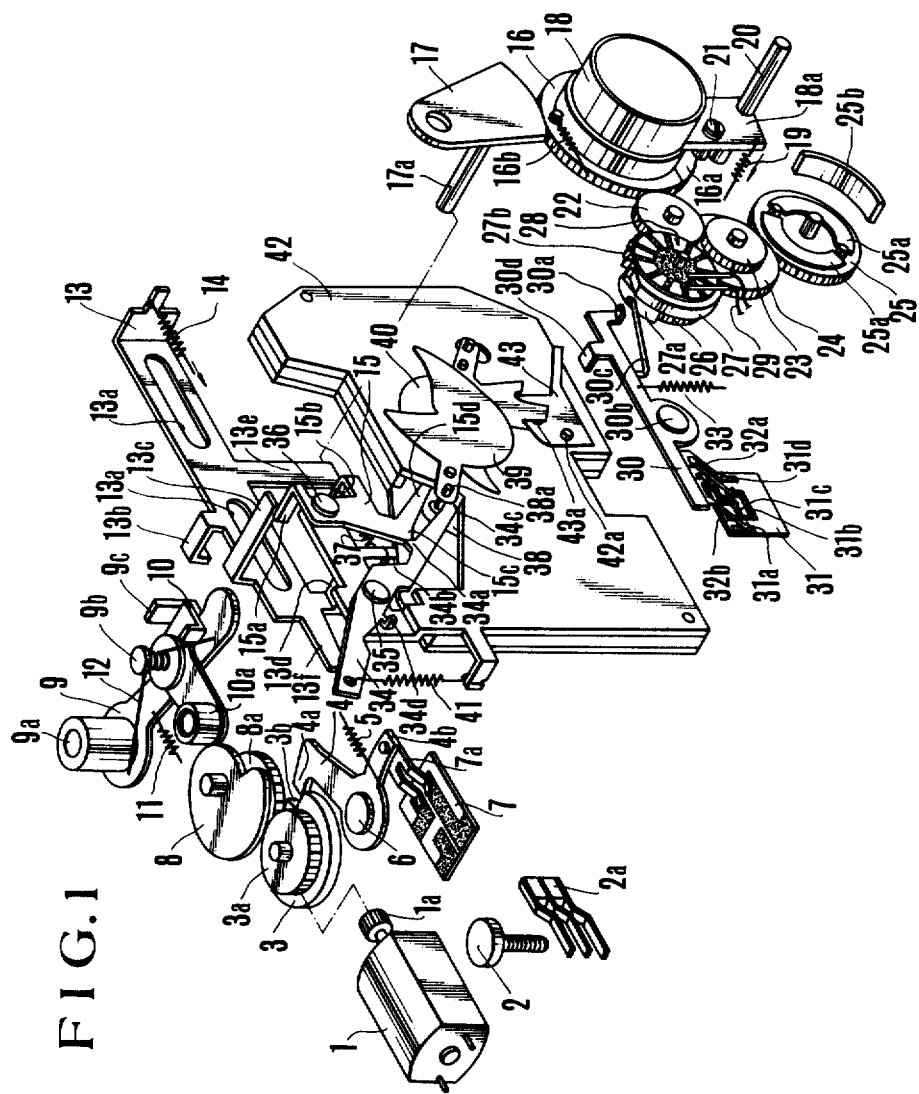
FIG. 1 is an exploded perspective view illustrating a preferred embodiment of the present invention.

In FIG. 1, an electric motor 1 for generating driving motion of a film transportation mechanism and performing charging of an AF mechanism has a pinion 1a on the output shaft thereof connected through a gear train (not shown) to rotate a gear 3a. An index cam 3 is fixed to the gear 3a and so constructed as to rotate one revolution for every one-frame advance of film. A latch lever 4 is pivotally mounted at a shaft 6 with its nose 4a arranged to be engageable with a detent notch 3b in the index cam 3 and urged by a spring 5 in a counterclockwise direction. Also, this latch lever 4 is provided at the other arm end 4b with an electrical contact 7a constituting part of a changeover switch 7. Therefore, with the electric motor 1 being energized, the film is advanced. When the advance has reached the length of one frame, the index cam 3 is stopped from further rotation by the latch lever 4, and, at the same time, the switch 7 is moved to terminate the duration of energization of the electric motor 1. Another switch 2a cooperative with a release button 2 may be actuated to initiate a camera operation and is connected to a control circuit (not shown) as is the switch 7.

8 is a charge cam for turning a charge lever 9 about a pivot shaft 9a in a counterclockwise direction through a roller 10a provided on one end portion of a one-way lever 10. This charge cam 8 is fixed to a gear 8a meshing with the gear 3a and which is so dimensioned as to turn one revolution for every one revolution of the gear 3a. Also, the one-way lever 10 is rotatably mounted on a pivot shaft 9b arranged on the charge lever 9 and is urged by a spring 12 to turn about the pivot shaft 9b in a counterclockwise direction. An upward extension 9c of the charge lever 9 limits the range of movement of the lever 10. A spring 11 urges the charge lever 9 in a clockwise direction and a set plate 13 is provided having two elongated slots 13a by which it is slidably supported. A spring 14 urges the set plate 13 in a direction indicated by arrow. This set plate 13 is arranged so that when the camera is ready for an exposure, its pawled portion 13c engages an end portion of a latch lever 15 to hold the set plate 13 in the illustrated position. Also, this set plate 13 is provided with another pawled portion 13b arranged to engage an end portion of the charge lever 9, a third pawled portion 13d to engage another end portion 15b of the latch lever 15, a fourth pawled portion 13e to engage a shaft 17a mounted on a sector gear 17 which meshes with a barrel ring 16, and a projected portion 13f arranged upon running down movement of the set plate 13 to engage the latch lever 4 at the tail end 4b and then to turn the latch lever 4 in a clockwise direction.

18 is a lens barrel holding a lens (not shown) and slidably movably mounted on a support shaft 20 through a barrel base plate 18a to be movable back and forth a viewed in the drawing. Screw-threadedly mounted in this base plate 18a is an adjusting screw 21 abutting on an axial movement control cam 16a for the barrel ring 16, whereby the lens barrel 18 is axially moved as it is guided by the support shaft 20. A spring 19 urges the lens barrel 18 in a direction indicated by the arrow, and another spring 16b urges the barrel ring 16 in a counterclockwise direction. Rotative motion of the barrel ring 16 is transmitted through gears 22 and 23 to a gear 24.

Figure 4:
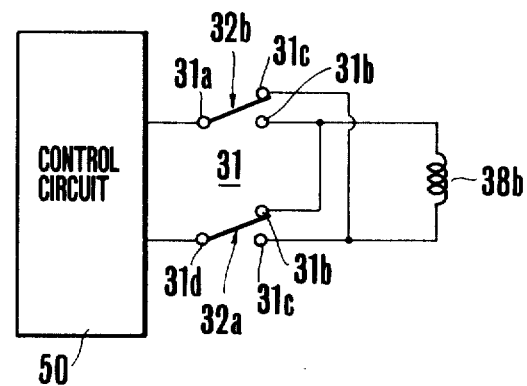
FIG. 4 is an electrical circuit diagram of a control circuit in the camera of FIG. 1.

25 is a governor gear meshing with the gear 24 and having radially movable centrifugal members 25a. The governor gear 25 is provided with arcuate frictional members 25b positioned to contact with the centrifugal members 25a when they are radially moved outwards. That is, the speed of rotation of the barrel ring 16 is moderated by the frictional force resulting from the frictional contact of the centrifugal members 25a with the frictional plates 25b which form part of the barrel supporting member. Next, 26 is a gear meshing with the gear 24. Fixed to this gear 26 is an AF control cam disc 27 having formed therein a toothed portion 27b for determining the axial position of the lens barrel 18 and having a pulse plate 28 on one side wall thereof to produce a pulse signal representing the angular position of the cam disc 27. A pair of electrical contacts 29 are in contact with this pulse plate 28. A stop lever 30 has a pawl 30a which upon engagement with the cam portion 27b of the AF control cam disc 27 will stop motion of the lens barrel 18. A spring 33 urges the stop lever 30 in a clockwise direction. This stop lever 30 responsive to detection of the fact that the lens barrel 18 has moved to the sharp focus position by the pulse plate 28 is released at its engagement portion 30d from the connection with a pawled portion 34d of a latch lever 34, whereby the end portion 30a is brought into engagement with the toothed portion 27b. Also, 30c is a charge spring arranged to contact with the camming surface of the lifting cam 27a when the camera is ready for an exposure (in the position of FIG. 1), whereby, the stop lever 30 is turned in a counterclockwise direction against the bias force of the spring 33 to hold the engagement portion 30d in a position where it is engageable with the pawled portion 34d of the latch lever 34. 31 is a changeover switch; 32a and 32b are contacts fixed to the opposite end portion of the stop lever 30 and slidingly movable on terminals 31a to 31d of the changeover switch 31. This changeover switch 31 is so constructed that, as illustrated in FIG. 4, the direction of current flow from a control circuit 50 to an electrically conductive coil 38b on a sector ring 38 is changed depending upon the angular position of the stop lever 30.

That is, the contacts 32a and 32b are made of an electrically conductive material, and one leg of the contact 32a always contacts with the terminal 31a, and one leg of the contact 32b always contacts with the terminal 31d. Also, when the contacts 32a and 32b move in response to pivotal movement of the stop lever 30, the other leg of the contact 32a changes its contacting position from the terminal 31c to the terminal 31b, and the other leg of the contact 32b changes its contacting position from the terminal 31b to the terminal 31c. Also, for this purpose, the terminals 31a and 31d are configured to an extended shape almost parallel to the path of movement of the contacts 32a and 32b. The terminals 31b and 31c are formed with portions extending into the paths of movement of the contacts 32a and 32b and the engagement of the terminals 31b and 31c with the contacts 32a and 32b occurs only near the stopping position.

42 is an intermediate plate which also serves as a magnetic circuit for an electromagnetically driven shutter. An auxiliary diaphragm blade 43 having a light metering window 43a is fixedly secured to the intermediate plate 42 by a half dowel 42a in caulked relation, on which are also rotatably supported a latch lever 34 and an engagement lever 15 by respective pivot shafts 35 and 36. The engagement lever 15 is urged by a spring 37 to turn about the pivot shaft 36 in a clockwise direction and holds the set plate 13 stationary by an engagement portion 15a thereof. Also, 15b is a spring hook to which is connected a spring 37, 15c is a pawled portion arranged to be engageable with first and second latch portions 34a and 34b of the latch lever 34, and 15d is a stopper for limiting movement of a sector pin 38a mounted on a sector ring 38 when the pawled portion 15c engages the first latch portion 34a of the latch lever 34, namely, when the camera is in the state before the release operation. A spring 41 urges the latch lever 34 in a counterclockwise direction, and the bias force of this spring 41 is preset to be slightly stronger than that of a spring 44 illustrated in FIGS. 2 and 3. Therefore, the sector ring 38 has a limited rotation in a counterclockwise direction by its sector pin 38a engaging the end portion 34c of the latch lever 34. Shutter blades 39 and 40 also serve as diaphragm blades, and open and close as rotation of the sector ring 38 is transmitted thereto through the sector pin 38a mounted thereon. Also the overlapping area of the shutter blades 39 and 40 is made sufficiently extensive so as not to open an exposure aperture even when the pawled portion 15c of the engagement lever 15 engages the second latch portion 34b of the latch lever 34 as illustrated in FIG. 3. It is noted that 38b is a conductor coil in the form of a pattern on the surface of the sector ring 38. When this coil is supplied with current, as the magnetic field M acting on linear portions of the coil 38b is co-related with the current flow to produce an electromagnetic driving force according to Fleming's left hand law, the sector ring 38 is driven to rotate. It is also noted that the polarity of each magnetic field M is so oriented that all the electromagnetic driving forces produced in the various linear portions of the conductor coil 38b can be summed up in one and the same direction.

In connection with such an electromagnetically driven shutter, it is noted that another form previously proposed by the present applicant may be employed, for example, as disclosed in U.S. Pat. No. 4,319,822 of Mar. 16, 1982, or in U.S. Pat. No. 4,348,092 of Sept. 7, 1982.

Figure 2:
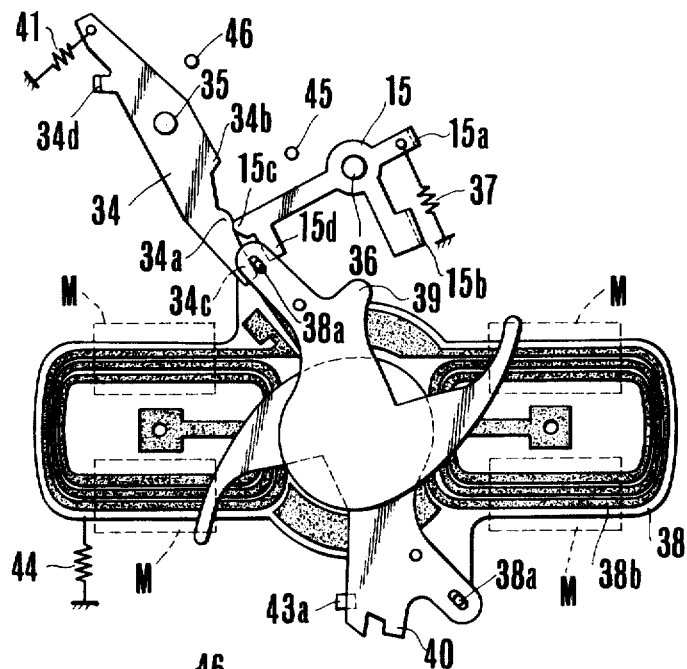
FIG. 2 is an elevational view of the embodiment of FIG. 1 in the exposure-ready position.
Figure 3:
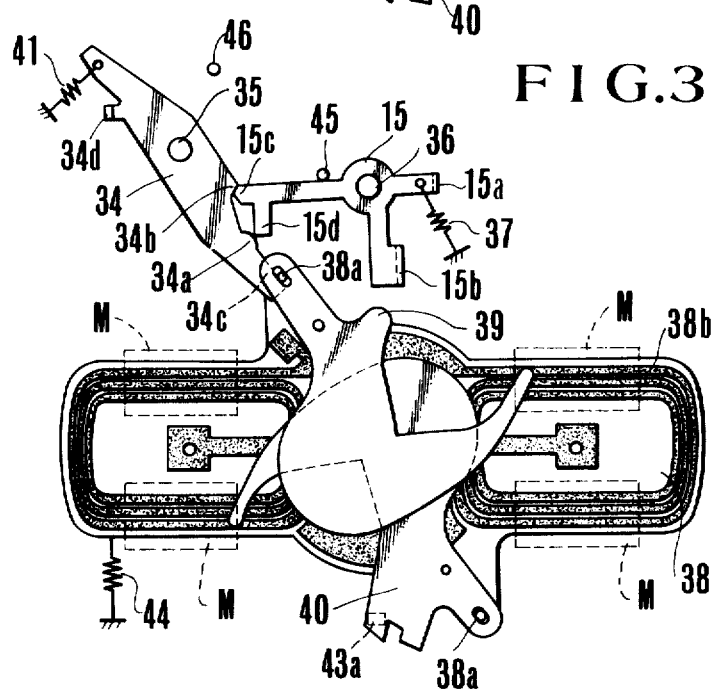
FIG. 3 is an elevational view of the embodiment of FIG. 1 in an operative position where the focus adjusting is completed.

With regard to the operation of the camera of the construction described above, the camera is assumed to be in the exposure-ready position illustrated in FIGS. 1 and 2. When the release button 2 is actuated to change over the release switch, an actuating signal is applied to a control circuit (not shown), whereby a light metering mechanism (not shown) is rendered operative. After the distance to an object to be photographed is measured, the control circuit 50 operates to permit current supply to the conductor coil 38b of the sector ring 38. Since, at this time, the changeover switch 31 assumes the position illustrated in FIG. 4, and the current flows in such a direction as to turn the sector ring 38 in the counterclockwise direction under the action of the electromagnetic driving force produced according to Fleming's left hand law, the force that drives the sector ring 38 in the counterclockwise direction (the sum of the bias force of the spring 44 and the electromagnetic forces) becomes stronger than the bias force of the spring 41 for clockwise movement of the sector ring 38. Therefore, the sector ring 38 is driven to rotate in the counterclockwise direction. Then, the sector pin 38a of the sector ring 38 abuts on the end portion 34c of the latch lever 34 and turns the latch lever 34 in the clockwise direction against the force of the spring 41 until its side surface abuts on the stop pin 46 of FIG. 2, whereby the connection of its first latch portion 34a with the pawled portion 15c of the engagement lever 15 is released. Therefore, the engagement lever 15 is turned by the bias force of the spring 37 in the clockwise direction until its side surface abuts on the stopper pin 45 of FIG. 2, whereby the connection of the engagement portion 15a with the pawled portion 13c of the set plate 13 is released. Then, the set plate 13 starts to move in a direction indicated by arrow by the bias force of the spring 14. Also since, at this time, the stop lever 30 is held in the illustrated position by the lifting cam 27a, as the latch lever 34 turns in the clockwise direction, the engagement portion 30d is engaged by the pawled portion 34d of the latch lever 34.

On the other hand, when the set plate 13 starts to move, the pawled portion 13e is also retracted from the position where it engaged the shaft 17a of the sector type gear 17 to restrain the barrel ring 16 from counterclockwise rotation. Therefore, the barrel ring 16 starts to rotate by the bias force of the spring 16b, while axially moving the lens barrel 18 through the control cam 16a along the support shaft 20 and also rotating the pulse disc 28 in the counterclockwise direction at an adjusted speed by the governor gear 25. The amount of rotation of the pulse disc 28 is measured by the slider 29 in the form of a number of pulses. When this pulse number has reached a value corresponding to the object distance sensed by the range finding mechanism, the current supply to the conductor coil 38b is cut off by the control circuit 50 of FIG. 4. Therefore, the electromagnetic driving forces of counterclockwise direction on the sector ring 38 disappear. As a result, the latch lever 34 is turned by the bias force of the spring 41 in the counterclockwise direction until its second latch portion 34b engages the pawled portion 15c of the engagement lever 15. Since, at this time, the pawled portion 34d of the latch lever 34 is released from the connection with the engagement portion 30d of the stop lever 30, the stop lever 30 turns about the shaft 30b in the clockwise direction under the action of the bias force of the spring 33, bringing its end portion 30a unto engagement with the toothed portion 27b of the AF control cam disc 27, thus arresting the rotating barrel ring 16. Therefore, the lens barrel 18 is also stopped from further axial movement with its stopped position being commensurate with the sharp focus condition for the given object. Such movement of this stop lever 30 also causes movement of the contacts 32a and 32b to invert the connection of the changeover switch 31. Therefore, the conductor coil 38b is supplied with current flowing in the reversed direction to that of current flow previously supplied thereby to turn the sector ring 38 in the clockwise direction. On the other hand, when the latch lever 34 turns to the position of FIG. 3, the sector ring 38, whose sector pin 38a is engaged by the end portion 34c, is caused to turn in the clockwise direction beyond the position of FIG. 2. Therefore, the overlapping area of the shutter blades 39 and 40 becomes smaller. By the way, even after the current supply to the conductor coil 38b is cut off and rotation of the barrel ring 16 is stopped, the set plate 13 continues moving. Then, at the terminal end of movement, its projected portion 13f pushes the engagement lever 4 at the end portion 4b, whereby the engagement lever 4 is turned in the clockwise direction against the bias force of the spring 5.

By this, the end portion 4a of the engagement lever 4 is taken out of engagement with the detent notch 3b of the index cam 3 to permit the gear 3a to rotate, and the contact 7a is slidingly moved on the switch substrate 7 to change over the switch 7. After a predetermined sequence corresponding to the change over, the conductor coil 38b of the sector ring 38 is energized again by the control circuit 50. Since, at this time, the changeover switch is inverted, the current supply to the conductor coil 38b causes the sector ring 38 to turn in the clockwise direction against the bias of the spring 44. Therefore, the shutter blades 39 and 40 are also moved from the position of FIG. 3 to open the exposure aperture, thus initiating an exposure. As the shutter blade 40 is opening, the light metering window 43a is also opened so that a light-sensitive element (not shown) senses the exposure amount.

After that, when the aforesaid light-sensitive element has integrated the exposure amount to a predetermined level, the control circuit 50 cuts off the current supply to the conductor coil 38b, causing the sector ring 38 to turn in the counterclockwise direction by the bias force of the spring 44 and therefore causing the shutter blades 39 and 40 to close, thus terminating the exposure.

After that, the control circuit 50 starts current supply to the motor 1. Motion of the motor 1 is transmitted through the gears 3a and 8a to rotate the charge cam 8 in the clockwise direction. Such movement of the charge cam 8 causes counterclockwise drive of the charge lever through the one-way lever 10 and therefore causes counterclockwise movement of the charge lever 9 about the pivot shaft 9a against the spring 11 which in turn causes the set plate 13 to be returned to the exposure-ready position by its end portion engaging the pawled portion 13b of the set plate 13 against the spring 14. Such movement of the set plate 13 brings its pawled portion 13d into abutting engagement with the engagement portion 15b of lever 15 and turns the engagement lever 15 about the pivot shaft 36 in the counterclockwise direction, whereby the pawled portion 15c is brought into engagement with the first latch portion 34a of lever 34. Then, as the pawled portion 13c of the set plate 13 engages the end portion 15a, the set plate 13 is stopped in the exposure-ready position. Such movement of the set plate 13 also causes rotative movement of the barrel ring 16 through the sector gear 17 against the bais force of the spring 16b which in turn causes the lens barrel 18 to return to the initial position under the action of the bias force of spring 19 and the AF indexing cam 27 also to turn in the clockwise direction, whereby the lifting cam 27a is returned to the initial position. Therefore, the stop lever 30 is turned in the counterclockwise direction as the charge spring 30c is pushed upward by the lifting cam 27a, and the engagement portion 30d is held in a position to be engageable with the pawled portion 34d of the latch lever 34.

Then, when the film has advanced through the length of one frame, as the index cam 3 turns one revolution, its detent slot 3b is aligned with the top end 4a of the engagement lever 4 to permit counterclockwise movement of the engagement lever 4. This causes the switch 7 to be changed over again so that the motor 1 is no longer energized, and thus the camera regains the position of FIG. 1.

As has been explained in greater detail above, the present invention contemplates the use of the electromagnetic drive device that would otherwise be adapted to control only the opening operation of the blade members in making it also possible for the blade members to be driven to move from the start point of operation even in another direction to close, whereby this additional driving feature in the closing direction is utilized in controlling the automatic focus adjusting mechanism. According, without causing the opening operation of the blade members to be disturbed, the above-described feature of the electromagnetic drive device makes it possible to control the operation of the automatic focus adjusting mechanism, with the advantage that building of the automatic focus adjusting mechanism into the camera having the moving coil type electromagnetic drive device can be facilitated. Another feature of the invention is that when the electromagnetic drive device is made to move from its start point to a direction for further closing the blade members, an operation of the automatic focus adjusting mechanism is initiated, and when its motion is stopped, the operation of the automatic focus adjusting mechanism is terminated in the in-focus position. Therefore, the exposure operation and the focusing operation can all be performed independently of each other by one electromagnetic device.

This produces advantages in that the camera of the character described can be constructed in a very simple form, and its operation can be controlled very accurately and reliably.

Also, according to the present invention, it is very easy to use means for permitting exposures with the self-timer arranged to be actuated after the completion of the focus adjusting.

Though the foregoing embodiment has been described in connection with a reversible switch responsive to termination of an automatic focus adjusting operation for reversing the direction of current flow from the control circuit to the conductor coil, it is to be understood that the present invention is not confined thereto. For example, the switch may be otherwise constructed in such form that an actuating signal is produced in response to termination of the automatic focus adjusting operation, and this signal is applied to the control circuit so that its output is inverted.

While a specific embodiment of the invention has been shown and described in detail to illustrate the application of the inventive principles, it will be understood that the invention may be embodied otherwise without departing from such principles.

What is claimed is:

1. A camera equipped with a focus adjusting mechanism for automatically moving a photographic lens to an in-focus position based on camera-to-object distance information and an exposure control mechanism for automatically controlling exposure based on object brightness information, comprising:
   (a) a coil positioned in a magnetic field, said coil exerting an electromagnetic force in different directions depending upon the direction of current flow therethrough;
   (b) a rotor arranged to rotate in response to the electromagnetic driving force exerted on said coil,
   (c) blade members connected to said rotor driven to open and close;
   (d) control means for controlling the operation of the focus adjusting mechanism by one cycle of operation of said rotor as said rotor is turned in a direction to close said blade members when a first current is supplied; and
   (e) changeover means arranged to be switched in response to termination of the operation of said focus adjusting mechanism so that the direction of current flow to said coil is reversed.

2. A camera according to claim 1, further comprising
   (f) an arresting member for causing motion of said focus adjusting mechanism to be stopped, said arresting member being controlled by the first half cycle of motion of said rotor so that the operation of said focus adjusting mechanism is terminated and said changeover means is inverted.

3. A camera according to claim 2, further comprising:
   (g) a latch member arranged to latch said arresting member in cooperation with said rotor when said rotor is turned by said first current supply, said latch member being urged by a stronger bias force than that acting on said rotor.

4. A camera according to claim 3, wherein said latch member holds said rotor in the initial position, and initiates an operation of said focus adjusting mechanism.

5. A camera according to claim 1, wherein a second current supply to said coil is initiated after said changeover means is inverted.

* * * * *